(12) United States Patent
Suter et al.

(10) Patent No.: US 6,253,787 B1
(45) Date of Patent: Jul. 3, 2001

(54) FLUID FLOW AND PRESSURE CONTROL SYSTEM AND METHOD

(75) Inventors: Roger Suter, Edmond, OK (US); Lester L. Cain deceased, late of Houston, TX (US), by Claudia R. Cain, executor

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 09/316,579

(22) Filed: May 21, 1999

(51) Int. Cl.$^7$ .................................................. F16K 31/12
(52) U.S. Cl. .................................... 137/509; 251/47
(58) Field of Search .......................... 251/47, 48, 54, 251/63, 63.5; 137/454, 509

(56) References Cited

U.S. PATENT DOCUMENTS

| | | | |
|---|---|---|---|
| 3,905,575 | * 9/1975 | Zeuner et al. | 251/30.02 |
| 4,355,784 | 10/1982 | Cain . | |
| 4,428,127 | * 1/1984 | Grassmann | 34/256 |
| 5,000,219 | * 3/1991 | Taube, Sr. et al. | 137/501 |

* cited by examiner

*Primary Examiner*—John Fox
(74) *Attorney, Agent, or Firm*—Haynes and Boone LLP

(57) ABSTRACT

A system and method for controlling fluid according to which an inlet passage and an outlet passage are formed in a housing and a choke member is movable in the housing to control the flow of fluid from the inlet passage to the outlet passage and to exert a back pressure on the fluid. The movement of the choke member from a fully closed position to an open position is dampened.

17 Claims, 4 Drawing Sheets

FLUID FLOW AND PRESSURE CONTROL SYSTEM AND METHOD

BACKGROUND

The invention relates to a system and method for controlling the flow and pressure of fluid, and, more particularly, to such a system and method according to which a choke is provided that automatically moves to control the flow of fluid in a system and to maintain a desired back pressure on the fluid no matter what flow conditions exist or occur within the system.

There are many applications in which there is a need to control the back pressure of a fluid flowing in a system. For example, in the drilling of oil wells it is customary to suspend a drill pipe in the well bore with a bit on the lower end thereof and, as the bit is rotated, to circulate a drilling fluid, such as a drilling mud, down through the interior of the drill string, out through the bit, and up the annulus of the well bore to the surface. This fluid circulation is maintained for the purpose of removing cuttings from the well bore, for cooling the bit, and for maintaining hydrostatic pressure in the well bore to control formation gases and prevent blowouts, and the like. In those cases where the weight of the drilling mud is not sufficient to contain the bottom hole pressure in the well, it becomes necessary to apply additional back pressure on the drilling mud at the surface to compensate for the lack of hydrostatic head and thereby keep the well under control. Thus, in some instances, a back pressure control device is mounted in the return flow line for the drilling fluid.

Back pressure control devices are also necessary for controlling "kicks" in the system caused by the intrusion of salt water or formation gases into the drilling fluid which may lead to a blowout condition. In these situations, sufficient additional back pressure must be imposed on the drilling fluid such that the formation fluid is contained and the well controlled until heavier fluid or mud can be circulated down the drill string and up the annulus to kill the well. It is also desirable to avoid the creation of excessive back pressures which could cause drill string to stick, or cause damage to the formation, the well casing, or the well head equipment.

However, maintenance of an optimum back pressure on the drilling fluid is complicated by variations in certain characteristics of the drilling fluid as it passes through the back pressure control device. For example, the density of the fluid can be altered by the introduction of debris or formation gases, and/or the temperature and volume of the fluid entering the control device can change. Therefore, the desired back pressure will not be achieved until appropriate changes have been made in the throttling of the drilling fluid in response to these changed conditions. Conventional devices generally require manual control of and adjustments to the choking device orifice to maintain the desired back pressure. However, manual control of the throttling device involves a lag time and generally is inexact.

U.S. Pat. No. 4,355,784, assigned to the assignee of the present application, discloses an apparatus and method for controlling back pressure of drilling fluid in the above environment which addresses the problems set forth above. According to this arrangement, a balanced choke device moves in a housing to control the flow and the back pressure of the drilling fluid. One end of the choke device is exposed to the pressure of the drilling fluid and its other end is exposed to the pressure of a control fluid. However, in this design, when the choke device moves from its closed position to an open position in response to either an increase in the well fluid pressure or a decrease in the control fluid pressure, it often moves too quickly and too far, thus often overshooting its normal operating position. This can cause pressure spikes and/or can allow a large volume of gas near the surface of the well to vent out of the device, both of which are undesirable.

Therefore, what is needed is a method and system for controlling back pressure of a flowing fluid which incorporates all the advantages of the system and method disclosed in the above patent, yet reduces any pressure spikes and gas venting when the choke moves from its closed position to an open position.

SUMMARY

Accordingly, a system and method are provided according to which an inlet passage and an outlet passage are formed in a housing and a choke member is movable in the housing to control the flow of fluid from the inlet passage to the outlet passage and to exert a back pressure on the fluid. The movement of the choke member from a fully closed position to an open position is dampened.

The choke device operates automatically to maintain a predetermined back pressure on the flowing fluid despite changes in fluid conditions. Also, highly accurate control of the back pressure at desired pressure values during shutting and opening of fluid flow through the system is achieved. Further, large pressure spikes and/or initial surges of the fluid when the choke device moves from a closed position to an open position are eliminated.

BRIEF DESCRIPTION OF THE DRAWINGS

FIG. 2 is an enlarged view of a portion of FIG. 1.

DETAILED DESCRIPTION

Figure 1:
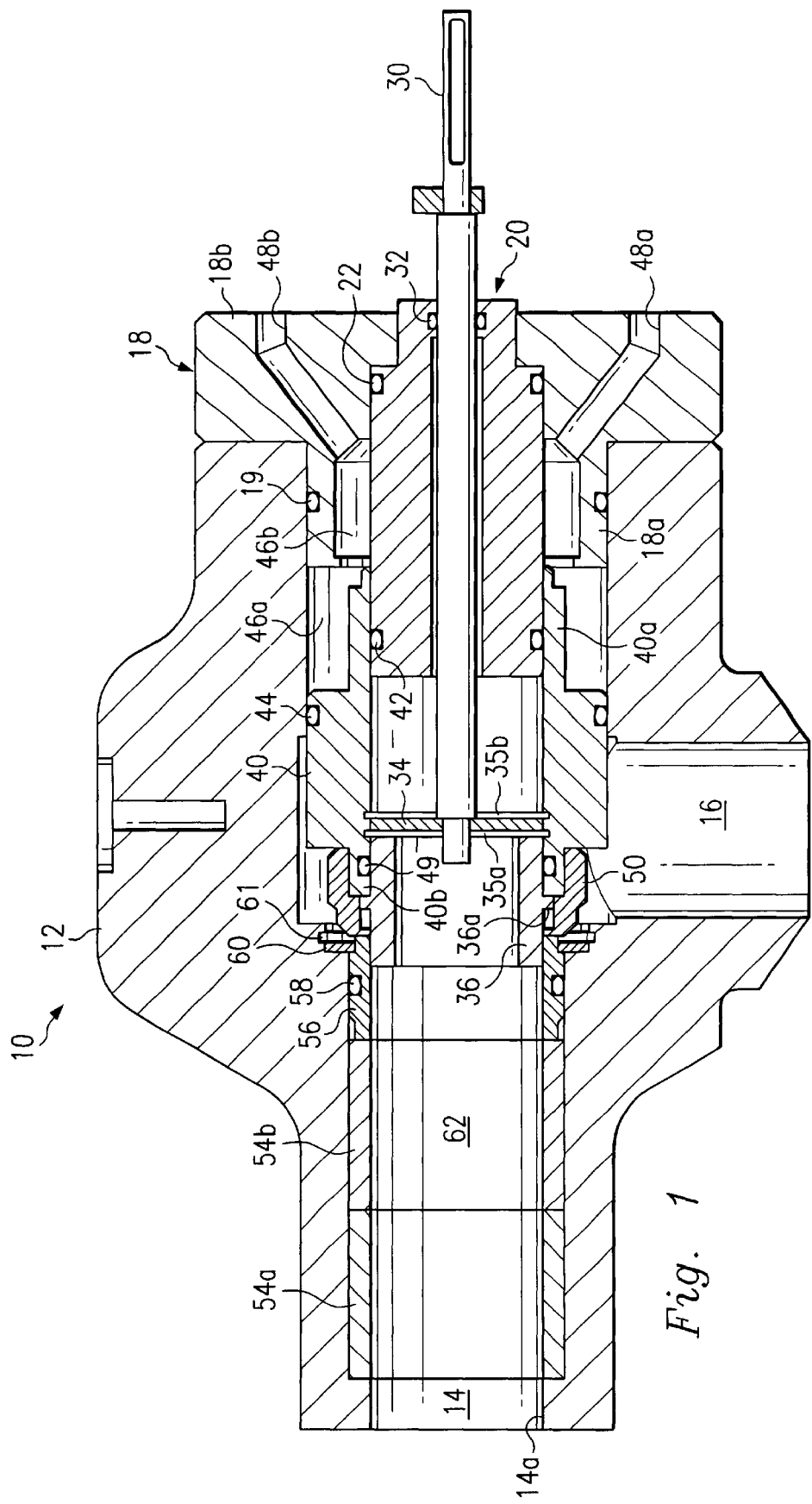
FIGS. 1–3 and 4 are cross sectional views of the system according to an embodiment of the invention, showing different operational modes.

Referring to FIG. 1, the reference numeral 10 refers, in general, to a back pressure control system according to an embodiment of the present invention. The system 10 includes a housing 12 having an axial bore 14 extending through its length and having a discharge end 14a. A radially extending inlet passage 16 is also formed in the housing 12 and intersects the bore 14. It is understood that connecting flanges, or the like, (not shown) can be provided at the discharge end 14a of the bore 14 and at the inlet end of the passage 16 to connect them to appropriate flow lines. Drilling fluid from a downhole well is introduced into the inlet passage 16, passes through the housing 12 and normally discharges from the discharge end of the bore 14 for recirculation.

A bonnet 18 is secured to the end of the housing 12 opposite the discharge end 14a of the bore 14. The bonnet 18 is substantially T-shaped in cross section and has a cylindrical portion 18a extending into the bore 14 of the housing. A seal ring 19 extends in a groove formed in an outer surface of the bonnet portional 8a and engages a corresponding inner surface of the housing 12. The bonnet 18 also includes a cross portion 18b that extends perpendicular to the cylindrical portion 18a and is fastened to the corresponding end of the housing 12 in any conventional manner.

A mandrel 20 is secured in the end portion of the bonnet 18, and a seal ring 22 extends between the outer surface of the mandrel and the corresponding inner surface of the bonnet. A rod 30 is slidably mounted in an axial bore extending through the mandrel 20, and a seal ring 32 extends in a groove formed in the inner surface of the mandrel defining the latter bore. The seal ring 32 engages the outer surface of the rod 30 as the rod slides in the bore of the mandrel 20 under conditions to be described. One end portion of the rod 30 projects from the corresponding ends of the mandrel 20 and the bonnet 18, and the other end portion of the rod 30 projects from the other end of the mandrel 20 and into the bore 14.

A spacer 34 is mounted on the latter end of the rod 30 in any known manner and is captured between two snap rings 35a and 35b whose function will be described in detail later. A cylindrical choke member 36 is disposed in the bore 14 with one end abutting the spacer 34. The choke member 36 is shown in its fully closed position in FIG. 1 and extends in the intersection of the bore 14 with the inlet passage 16 to control the flow of fluid from the latter to the former, as will be described.

A cylindrical shuttle 40 is slidably mounted over the mandrel 20, and a seal ring 42 extends in a groove formed in an outer surface of the mandrel and engages a corresponding inner surface of the shuttle. Similarly, a seal ring 44 extends in a groove formed in an outer surface of the shuttle 40 and engages a corresponding inner surface of the housing 12. The shuttle 40 has a reduced-diameter portion 40a that defines, with the inner surface of the housing 12, a fluid chamber 46a. Another fluid chamber 46b is defined between the outer surface of the mandrel 20 and the corresponding inner surface of the bonnet portion 18a. The chambers 46a and 46b communicate and receive a control fluid from a passage 48a formed through the bonnet 18. It is understood that the passage 48a is connected to a hydraulic system (not shown) for circulating the control fluid into and from the passage. In this context the control fluid is introduced into the passage 48a, and therefore the chambers 46a and 46b, at a predetermined, desired set point pressure as determined by a set point pressure regulator and measured by a gauge located on an associated console. Since the pressure regulator, the gauge and the console are conventional they are not shown and will not be described in any further detail.

The control fluid enters the chambers 46a and 46b and acts against the corresponding exposed end portions of the shuttle 40. The shuttle 40 is designed to move so the force caused by the pressure of the control fluid from the chambers 46a and 46b at the predetermined set point pressure acting on the corresponding exposed end portions of the shuttle is equal to the force caused by the pressure of the drilling fluid in the passage 16 acting on the corresponding exposed end portions of the other end of the shuttle and the retainer 50. Thus, the shuttle 40 is normally in a balanced condition as will be described.

A passage 48b is also formed through the bonnet portion 18 for bleeding air from the system through a bleed valve, or the like (not shown) before operation.

The shuttle 40 has an externally threaded, reduced-diameter, end portion 40b which extends over a portion of the choke member 36. A seal ring 49 extends in a groove formed in an inner surface of the end portion 40b and engages a corresponding outer surface of the choke member 36. An internally threaded trim nut 50 threadedly engages the end portion 40b of the shuttle 40 and extends over an annular flange 36a formed on the choke member 36, to capture the choke member on the shuttle. The shuttle 40 also has two spaced grooves formed in its inner diameter for receiving the snap rings 35a and 35b. Therefore, axial movement of the shuttle 40 over the fixed mandrel 20 under conditions to be described, causes corresponding axial movement of the choke member 36, and therefore the spacer 34 and the rod 30.

Two cylindrical liners 54a and 54b are provided in the bore 14 downstream of its intersection with the passage 16. A choke seat 56 is also disposed in the bore upstream from the liner 54b, and a seal ring 58 extends in a groove formed in the outer surface of the choke seat and engages a corresponding portion of the inner surface of the housing 12. The choke seat 56, and therefore the liners 54a and 54b, are retained in the bore 14 by a static trim member 60 which is retained in a groove formed in the inner surface of the housing 12 by snap ring 61. The liners 54a and 54b and the choke seat 56 define a discharge passage 62 in the bore 14 of the housing 12 extending from the intersection of the bore 14 and the passage 16 to the discharge end 14a of the bore 14. The internal diameter of the choke seat 56 is sized relative to the outer diameter of the choke member 36 to receive same in a relatively tight fit, as will be described.

Figure 2:
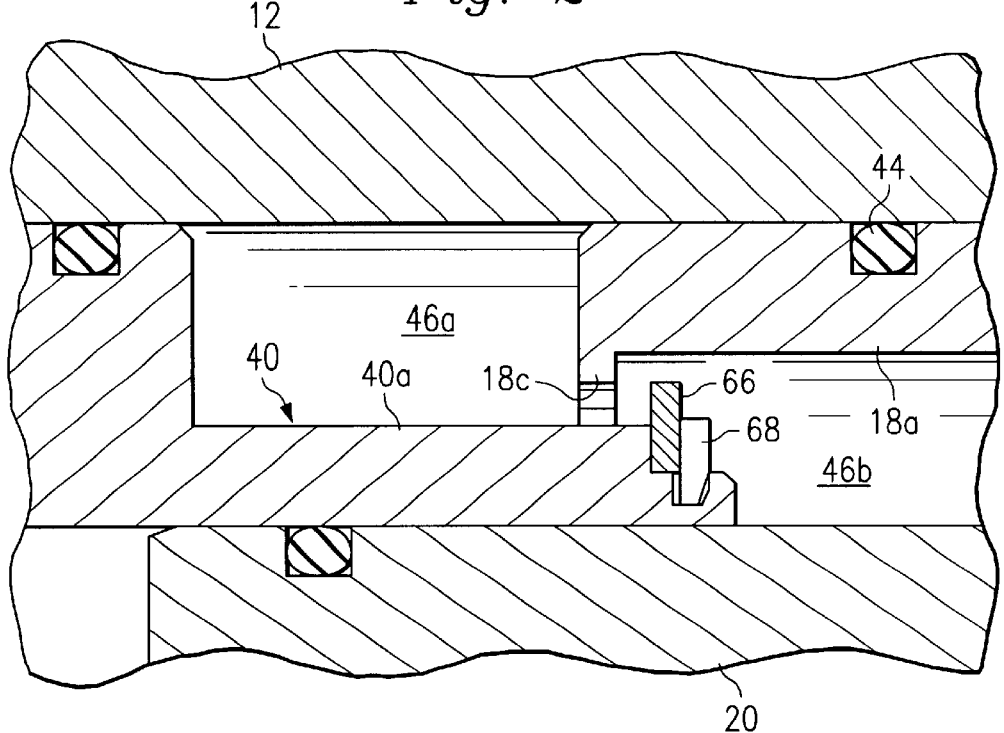

As better shown in FIG. 2, the end portion of the shuttle portion 40a is stepped down to a smaller diameter, and a washer 66 butts against the shoulder thus formed. A snap ring 68 extends in an annular groove formed in the latter end portion and retains the washer 66 against the shoulder. The outer radial portion of the washer 66 projects radially outwardly from the outer surface of the shuttle portion 40a. An annular lip 18c extends radially inwardly from the end portion of the bonnet portion 18a and is sized to define a restricted space between it and the washer, yet permit the washer to pass though the lip with a relatively small clearance.

Thus, when the shuttle 40 moves relative to the mandrel 20 and to the bonnet 18 under conditions to be described, the washer 66 passes through the circular space defined by the lip 18c. Since the control fluid is present in the annular space between the outer surface of the washer 66 and the inner surface of the lip 18c the latter movement of the shuttle 40 is dampened, i.e. a dashpot effect is created. This prevents excessively quick movement of the shuttle 40 for reasons to be described.

Figure 3:
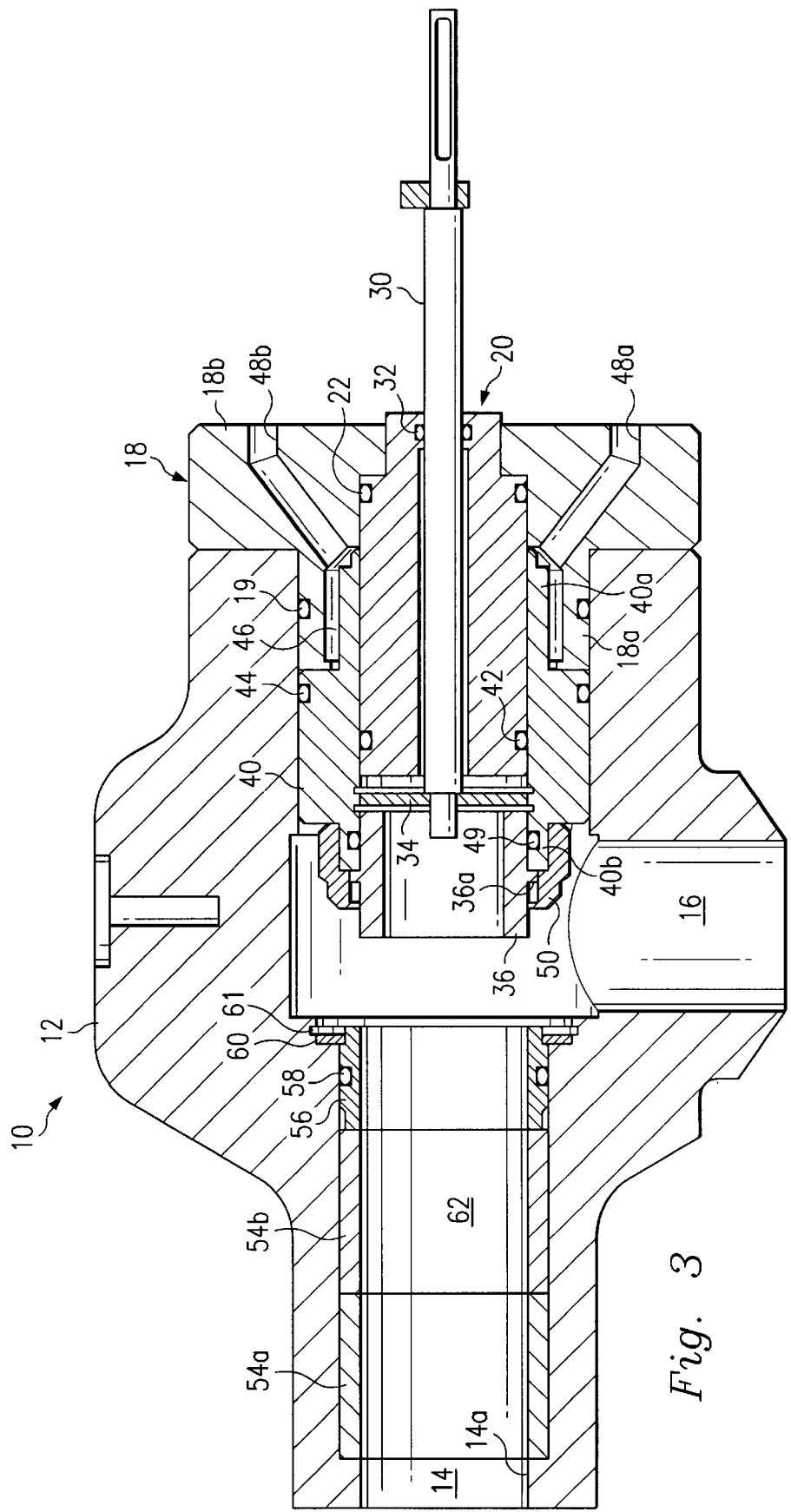

In operation, it will be assumed that the choke member 36 is in its maximum open position shown in FIG. 3. In this position, the "throttling" area, that is, the area between the end of the choke member 36 and the choke seat 56, is greater than the area of the discharge passage 62. Thus, there is no back pressure imparted to the drilling fluid as it passes through the inlet passage 16 and the discharge passage 62 and discharges from the housing 12 for recirculation.

When it is desired to exert a back pressure on the drilling fluid in the passage 16 for reasons described above, control fluid from the external source described above is introduced, at the above-mentioned predetermined set point pressure, into the passage 48a and thus passes into the chambers 46a and 46b. As the drilling fluid passes from the well being drilled, into and through the inlet passage 16 and into the housing 12, the effective opening, or passage, between the inlet passage 16 and the discharge passage 62 is controlled by the axial movement of the choke member 36 relative to the choke seat 56. The design is such that the set point pressure moves the choke member from the maximum open position of FIG. 3 towards a standard operating position shown in FIG. 4. In the latter position, the choke member 36 throttles the fluid in the inlet passage 16, thus creating a back pressure on the latter fluid that extends back through the well bore. This occurs until a fluid pressure is present in inlet passage 16 that acts on the corresponding end of the shuttle 40 with the same force as imposed on the other end of the shuttle by the pressure of the control fluid in the chambers 46a and 46b. This balanced condition of the choke member 36 is the standard operating position shown in FIG. 4. In this position, a very small gap is maintained between the corresponding ends of the choke member 36 and the seat 56 which allows a relative small amount of the drilling fluid to pass into the discharge chamber 62 while maintaining the above-mentioned back pressure.

In view of the balanced condition of the shuttle 40, and therefore, the choke member 36, any changes in the condition of the drilling fluid (such as circulating rate, density, and temperature), resulting in corresponding changes in the pressure of the latter fluid acting on the shuttle, causes the shuttle to move accordingly until the balanced condition is reestablished. Thus, the system 10 establishes and maintains a predetermined back pressure on the drilling fluid despite changes in its characteristics.

Of course, the shuttle 40, and therefore the choke member 36, can be moved to the fully closed position shown in FIG. 1 by simply raising the pressure of the control fluid in the chambers 46a and 46b to a value above the predetermined set point pressure. This drives the shuttle 40, and therefore the choke member 36, in a direction from right-to-left as viewed in the drawings until the choke reaches its fully closed position in which fluid flow from the inlet passage 16 to the discharge passage 12 is blocked.

Figure 4:
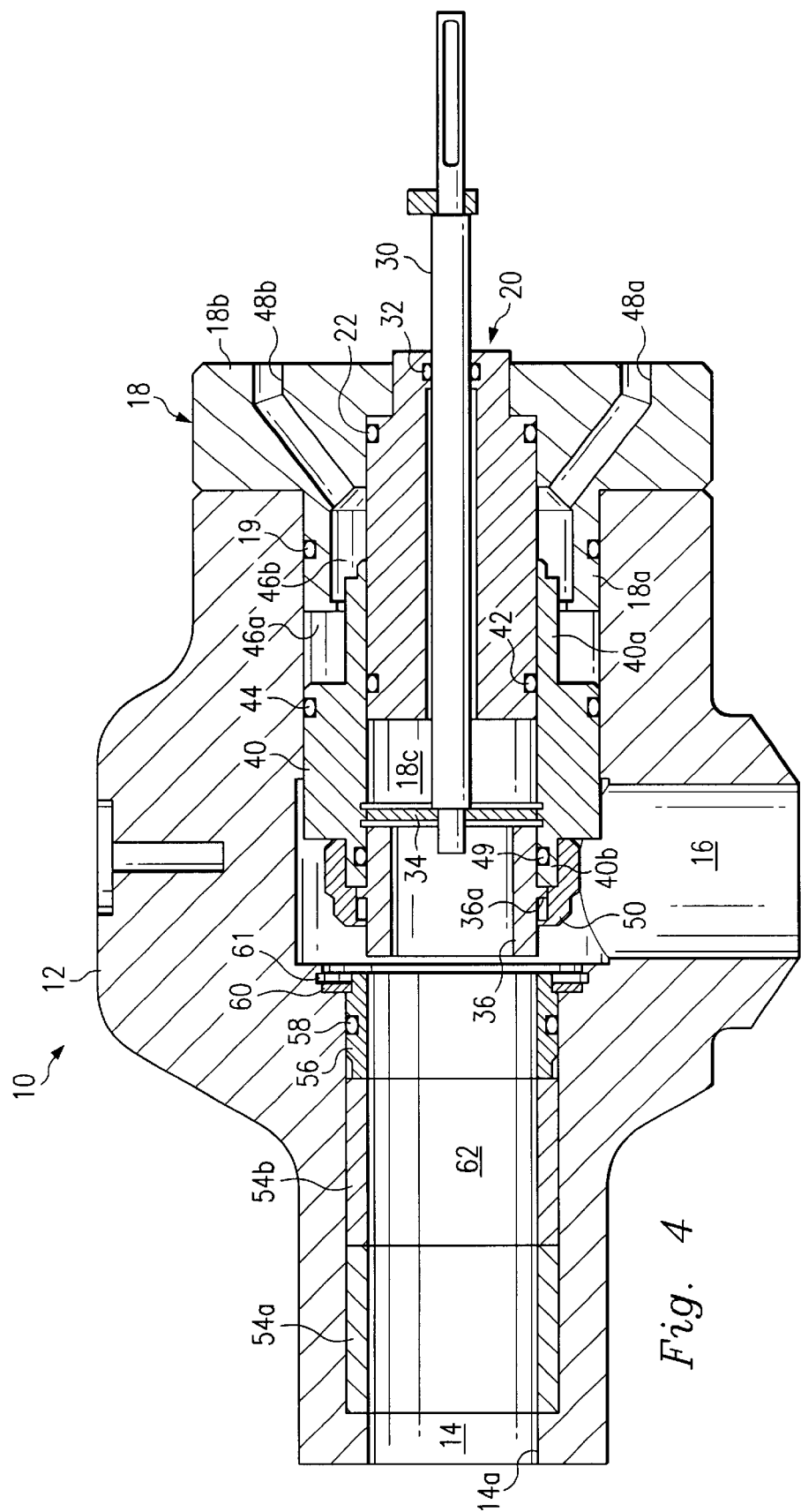

If it is desired to move the shuttle 40, and therefore the choke member 36, from the closed position of FIG. 1 to the standard operating position of FIG. 4, the pressure of the control fluid in the chambers 46a and 46b is reduced to the predetermined set point value (or the pressure of the drilling fluid in the inlet passage 16 is increased). This causes the shuttle 40 to move in a direction from left-to-right as viewed in the drawings thus communicating the inlet passage 16 with the discharge passage 62 and causing the drilling fluid to flow from the former to the latter. This latter flow will decrease the pressure of the drilling fluid until it equals the set point pressure of the control fluid in the chambers 46a and 46b and the system is in its standard, balanced operating position as described above. Thus, once the set point pressure is set, the console control system automatically feeds or takes fluid from the system 10 to allow the shuttle 40 to move to the appropriate position to control the set point pressure.

During this movement of the shuttle 40, and therefore the choke member 36 from the closed position of FIG. 1 to the standard operating position of FIG. 4 as described above, the washer 66 passes through the circular space defined by the lip 18c of the bonnet 18. Since the control fluid is present in the restricted annular space between the outer surface of the washer 66 and the inner surface of the lip 18c, the latter movement of the shuttle 40, and therefore the choke member 36, is dampened, i.e. a dashpot effect is created. This prevents excessively quick movement of the shuttle 40 and thus eliminates any pressure spikes and/or initial surges of the fluid which very well could occur if this movement was not dampened.

All of the above movements of the shuttle 40 cause corresponding movement of the spacer 34 and the rod 30. Thus, the length of the portion of the rod 30 that projects from the housing 12 varies accordingly and thus provides an indication of the relative position of choke member 36 with respect to choke seat 50 and therefore the degree of fluid throttling and back pressure.

In those situations where a significant pressure drop occurs in the inlet passage 16, or where a shut-down of the circulation of the drilling fluid is desired, the choke member 36 moves, or is moved, to its closed position of FIG. 1 to terminate all flow through the housing 12.

Several advantages result from the foregoing. For example, the system 10 operates automatically to maintain a predetermined back pressure on the drilling fluid despite changes in fluid conditions. Also, highly accurate control of the back pressure at desired pressure values during the above-described shutting and opening of the choke member 36 is achieved. Further, as emphasized above, any pressure spikes and/or initial surges of the drilling fluid when the choke member 36 moves from a closed position to an open position are reduced. Still further, any debris that would tend to plug the passage 16 will increase the pressure of the drilling fluid and cause the shuttle 40, and therefore the choke member 36, to move to increase the communication between the two passages, maintain the latter pressure at the set point pressure, and cause at least a portion of the debris to release. Also, the size of the washer 66 or the shuttle portion 40c can be varied to vary the dampening characteristics accordingly.

Figure 5:
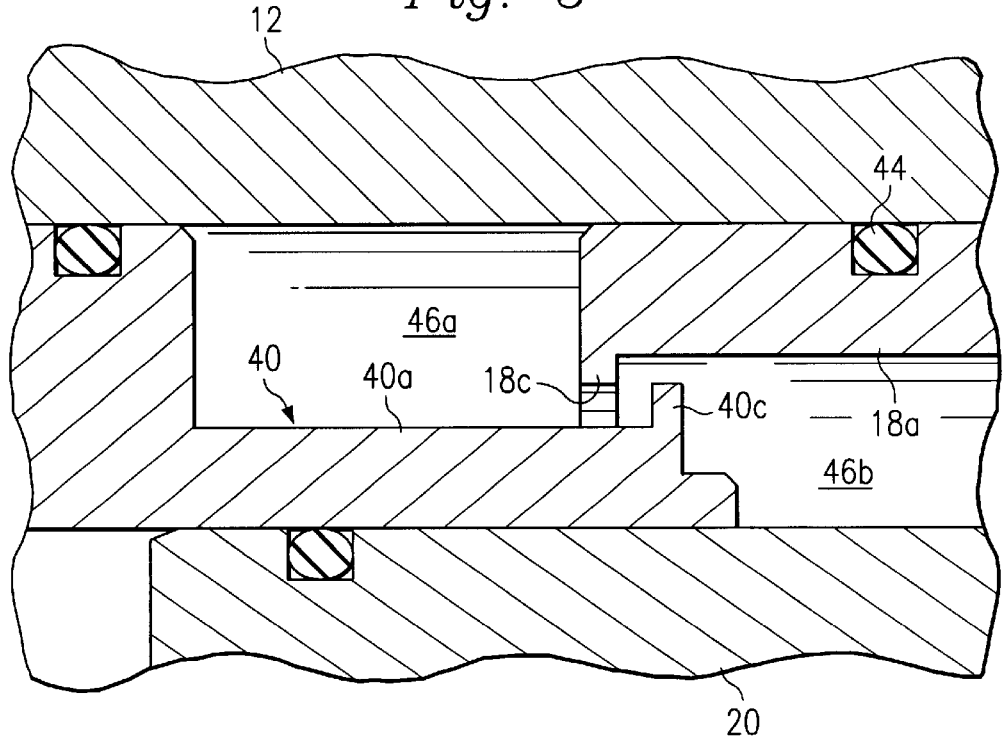
FIG. 5 is a view similar to FIG. 2 but depicting an alternate embodiment of the present invention.

An alternate embodiment of the present invention is shown in FIG. 5. According to this embodiment, the washer 66 of the previous embodiment is replace by an end portion 40c formed on the end portion of the shuttle portion 40a. The end portion 40c is formed integrally with the shuttle portion 40a and is preferably machined from the same stock. The end portion 40c projects radially outwardly from the outer surface of the shuttle portion 40a and functions identically to the washer 66, i.e. it cooperates with the lip 18c of the bonnet 18 to dampen the movement of the shuttle 40 in the manner described above.

It is understood that variations may be made in the foregoing without departing from the scope of the invention. For example, the present invention is not limited to the processing of drilling fluid in an oil field environment but is equally applicable to any application involving the control of fluid flow and the applying of a back pressure to same.

Since other modifications, changes, and substitutions are intended in the foregoing disclosure, it is appropriate that the appended claims be construed broadly and in a manner consistent with the scope of the invention.

What is claimed is:

1. A fluid control system comprising:
   a housing having an inlet passage, an axial bore a portion of which forms an outlet passage, and a chamber;
   a choke member adapted for movement in the housing to control the flow of fluid from the inlet passage to the outlet passage, the fluid applying a force on one end of the choke member;
   a source of control fluid connected to the chamber so that the control fluid applies an equal force on the other end of the choke member to control the position of the choke member in the housing in a manner to exert a back pressure on the fluid in the inlet passage;
   a washer attached to the choke member and projecting radially outwardly from the choke member, the outer surface of the washer moving in the chamber and cooperating with a corresponding surface of the housing to define a restricted area for the fluid in the chamber, for dampening the movement of the choke member;

a mandrel fixed to the housing and extending in another portion of the bore; and a shuttle connected to the choke member and slidably mounted on the mandrel within the latter bore portion.

2. The system of claim 1 wherein the choke member is movable in the housing to and from a fully closed position, a fully open position, and a standard operating position between the fully closed position and the fully open position.

3. The system of claim 2 wherein the washer dampens the movement of the choke member from the fully closed position.

4. The system of claim 2 wherein the choke member exerts the back pressure on the fluid in the closed position and in the standard operating position.

5. The system of claim 1 wherein the corresponding surface of the housing projects towards the washer to define the restricted area.

6. The system of claim 1 wherein the dampening means comprising a projecting portion of the shuttle, the outer surface of the projecting portion moving in the chamber and cooperating with a corresponding surface of the housing to define a restricted area for the fluid in the chamber.

7. The system of claim 6 wherein the corresponding surface of the housing projects towards the projecting portion of the shuttle to define the restricted area.

8. The system of claim 1 further comprising a rod extending through the mandrel, with one end portion of the rod extending outside the housing, the rod being adapted for axial movement in response to movement of the shuttle, so that the position of the end portion of the rod indicates of the position of the shuttle and choke element in the housing.

9. The system of claim 1 further comprising a seat member for receiving the choke member in its fully closed position.

10. The system of claim 1 wherein an axial bore is formed in the housing, a portion of which forms the outlet passage and further comprising a mandrel fixed to the housing and extending in another portion of the bore, the shuttle being slidably mounted on the mandrel within the latter bore portion.

11. A fluid control system comprising:

a housing having an inlet passage, an axial bore a portion of which forms an outlet passage, and a chamber;

a choke member adapted for movement in the housing to control the flow of fluid from the inlet passage to the outlet passage, the fluid applying a force on one end of the choke member;

a source of control fluid connected to the chamber so that the control fluid applies an equal force on the other end of the choke member to control the position of the choke member in the housing in a manner to exert a back pressure on the fluid in the inlet passage;

a mandrel fixed to the housing and extending in another portion of the bore;

a shuttle connected to the choke member and slidably mounted on the mandrel within the latter bore portion; and a washer attached to the shuttle and projecting radially outwardly from the shuttle, the outer surface of the washer moving in the chamber and cooperating with a corresponding surface of the housing to define a restricted area for the fluid in the chamber, for dampening the movement of the shuttle.

12. The system of claim 11 wherein the choke member is movable in the housing to and from a fully closed position, a fully open position, and a standard operating position between the fully closed position and the fully open position.

13. The system of claim 11 wherein the dampening member dampens the movement of the choke from the fully closed position.

14. The system of claim 12 wherein the choke member exerts the back pressure on the fluid in the closed position and in the standard operating position.

15. The system of claim 11 wherein the corresponding surface of the housing projects towards the washer to define the restricted area.

16. The system of claim 11 further comprising a rod extending through the mandrel, with one end portion of the rod extending outside the housing, the rod being adapted for axial movement in response to movement of the shuttle, so that the position of the end portion of the rod indicates of the position of the shuttle and choke element in the housing.

17. The system of claim 11 further comprising a seat member for receiving the choke member in its fully closed position.

* * * * *